United States Patent [19]  [11] Patent Number: 4,913,344
Bauer  [45] Date of Patent: Apr. 3, 1990

[54] WATER RINSE SYSTEM FOR PNEUMATIC SPREADERS

[75] Inventor: Norman A. Bauer, Watertown, Minn.

[73] Assignee: Ag-Chem Equipment Co., Inc., Minneapolis, Minn.

[21] Appl. No.: 358,707

[22] Filed: May 30, 1989

[51] Int. Cl.$^4$ .................................................. B05B 15/02
[52] U.S. Cl. .................................... 239/112; 239/654; 239/655
[58] Field of Search ............... 239/104, 106, 112, 654, 239/655

[56] References Cited

U.S. PATENT DOCUMENTS 4,215,824  8/1980  Weiste .................................. 239/655
4,489,892  12/1984  Tyler .................................. 239/655 X
4,767,062  8/1988  Fletcher .................................. 239/655

Primary Examiner—Andres Kashnikow
Assistant Examiner—William Grant
Attorney, Agent, or Firm—Haugen and Nikolai

[57]  ABSTRACT

An improved water rinse system for cleaning pneumatic spreaders used for selective distribution of particulate material onto agricultural fields from selected ones of a plurality of elongated booms. The improved feature of the present invention comprises a means to apply a water rinse to the entire system and to the booms for cleaning the system. The system includes a means for introducing a flow of water to the top of the distribution head for ultimate transfer through the entire system.

2 Claims, 2 Drawing Sheets

WATER RINSE SYSTEM FOR PNEUMATIC SPREADERS

CROSS-REFERENCE TO RELATED APPLICATIONS

The present invention finds particular utility for use in combination with that certain "Venturi System for Agricultural Spreaders of Solid Particles" disclosed in co-pending application Ser. No. 07/315,277, filed Feb. 24, 1989, Harry H. Takata and "Boom Flow Control Mechanism for Pneumatic Spreaders" of Harry H. Takata and executed on even date herewith, both assigned to the same assignee as the present invention, with the disclosures thereof being incorporated by reference into the disclosure of this invention.

BACKGROUND OF THE INVENTION

The present invention relates generally to an improved pneumatic spreader system for distribution of agricultural crop treating chemicals in granular, particulate or pulverulent solid form upon the soil, and more particularly to a system for ease of cleaning and rinsing the interior of such systems through the use of a generally annular ring with water discharge orifices arranged along the length thereof, and wherein means are provided for controlling the flow of water to the ring for controlled water discharge into the system. The apparatus of the present invention is effective in cleaning and rinsing the system prior to use for other applications, and is further effective against material build-up prior to storage or extended periods of non-use.

Pressurized pneumatic systems utilizing a single distribution head delivering or metering a supply of granular or particulate material for controlled discharge of such material from a plurality of elongated booms have been employed in the past, and the systems currently in use are frequently employed by custom applicators wherein relatively clean conditions are required for start-up of application. Reliable means have not been available for the periodic and controlled cleaning of granular products or materials from the system, including all of the booms. The present invention provides a reliable and effective system for such controlled cleaning and rinsing.

Agricultural techniques require the utilization of soil treating agents to either encourage, discourage, destroy, or inhibit plant growth. Such agents may generally be characterized as crop treating chemicals, and include materials designated as nutrients such as fertilizers, and pesticides such as insecticides and herbicides including pre-emergent and/or post-emergent plant growth inhibitors. Accordingly, the term "crop treating chemical" is used in a comprehensive sense to incorporate those various ingredients utilized in agriculture to treat either the soil, the growing crop or plants, or certain insects which may damage the crop. Active materials used for treatment are commonly found in one of three forms, either water soluble, water wettable, particulate solid or in surface-impregnated solid form. In connection with the present invention, granular materials and/or surface-impregnated (wetted) granular materials are of particular interest, with the system of the present invention being particularly adapted for use in connection with the cleaning and rinsing of the system following use of one specific type of granular material prior to use for the distribution of a different material through the system and onto the soil or other surfaces being treated and wherein contamination of the new material to be treated could occur without adequate cleaning and preparation of the system.

In the treatment of agricultural fields and crops through spreading of one or more active treating ingredients, the efficiency of the treatment operation may be enhanced if steps are taken to avoid cross-contamination of the ingredients being distributed. Crop treating chemicals are frequently specific to a given application, and improper use of materials, or use of contaminated materials may be harmful to the crop being treated.

Pneumatic spreader systems typically are mounted upon self-propelled vehicles, thereby providing a means for achieving the distribution. In order to render these systems efficient, elongated booms are employed, and it is not uncommon for such booms to extend outwardly a distance of 18 feet or more from the center axis of the vehicle. Effective means must be provided in order to appropriately clean and rinse the entire expanse of the system. It is a feature and advantage of the system of the present invention to permit effective clean-up and rinsing of the arrangement whenever such operation is indicated.

Pressurized pneumatic systems normally employ a plurality of elongated hollow delivery booms, with these booms extending outwardly of the vehicle to certain predetermined and differing lengths. In order to preserve system cleanliness, operational integrity and predictability, therefore, means are provided in accordance with the present invention to render it possible to effectively clean and rinse the entire system, while at the same time, making it possible to activate the system to enhance movement of material through the fixed end of the elongated delivery booms. In the past, attempts have been made to provide a rinsing capability for pneumatic spreaders, however such systems frequently suffer from lack of uniformity of delivery of water into the flow, thus contributing to an inability to effectively clean the entire arrangement, including the distribution head. The features of the present invention have been found desirable for improving the performance of systems utilizing elongated hollow discharge or delivery booms through the provision of a hollow annular ring or annulus which is disposed above the spinner in the distribution head.

SUMMARY OF THE INVENTION

Briefly, and in accordance with the present invention, an improved solid granular chemical applicator system is provided which improves the performance of pressurized pneumatic spreader systems utilizing elongated booms by providing a means for effectively cleaning and rinsing the system from the distribution head, while providing a means for introduction of water which makes it possible for complete and uniform dispersal of the rinse water through the entire system. Specifically, and in accordance with the present invention, a water discharging annulus is provided within the upper portion of the distributor head, whereby cleaning and rinsing water is introduced into the system and dispersed uniformly throughout the entire mechanism, particularly throughout the individual baffles and other components which are normally found within the distributor heads. The system includes a reservoir with a source of supply of agricultural crop treating chemicals in granular or particulate solid form to be distributed, such as, for example, a nutrient such as a fertilizer and/or a pesticide such as an insecticide or herbicide, along with a spreader and distribution mechanism. As indicated, the granular materials may have their surfaces impregnated with a coating of a pesticide/herbicide. Use of effective cleaning and rinsing means is a particular requirement whenever the system has been used for the application of herbicides.

The applicator systems employing the present invention are typically provided with a number of conventional components, including the following:

(a) a reservoir or hopper for retaining a supply of particulate solids;

(b) a means of conveying the granular particulate solids to a distribution head where the supply is metered by being divided into a number of aliquot portions;

(c) a means for delivering the metered aliquot portions to the elongated booms; and (d) a means, such as a blower or compressor for delivering a supply of compressed air, to move the material along with a flow of air outwardly through the booms and ultimately to a point of discharge.

Turning to these components briefly, and individually, a distribution head controllably vented to atmosphere is provided, as indicated, for receiving a supply of particulate solids, and for metering and apportioning these solids into a plurality of generally aliquot portions. A plurality of elongated hollow discharge or delivery booms are employed, with the proximal end of each boom being coupled to and receiving a source of pressurized or compressed air such as at a plenum chamber.

GENERAL SYSTEM OPERATION

A discharge or delivery port is formed in the boom at or adjacent the distal end thereof, with the granular crop treating material or chemical being discharged from that point. A tubular conduit or feed supply tube is coupled to the normal output of the distribution head, and is adapted to normally convey one aliquot portion of granular material from the distribution head to a junction point with a discharge or delivery boom. The junction point is located adjacent the inner or proximal end of the boom at a point closely spaced from and immediately downstream of the proximal end thereof. In normal operation, the flow of air through the booms serves a dual purpose, one purpose being to carry or support the flow of granular material to the discharge point of the boom, the other being to create a partial vacuum in the tubular conduit or feed supply tube for introduction of granular solids into the air stream. The tubular conduit or feed supply tube further acts as a conduit for the rinse water delivered to the distributor head through the apparatus of the present invention. Therefore, in operation, each conduit or tubular feed member delivers one aliquot portion from the distribution head into the boom, with the compressed air normally carrying or moving the particulate solids outwardly to the delivery point located at the boom tip. When the cleaning and rinse system of the present invention is in operation, the compressed air assists in moving the cleansing liquid outwardly to the delivery point where it is discharged from the boom.

As indicated hereinabove, the system of the present invention has been found to function well in combination with that certain system disclosed in application Ser. No. 07/315,277, filed Feb. 24, 1989, and referred to hereinabove, along with that certain application entitled "Flow Control Mechanism for Pneumatic Spreaders" executed on even date herewith, with the apparatus of the present invention being disclosed while mounted within, and functioning with such a system. As indicated, that system includes a Venturi means which comprises a flow wedge with an inlet ramp portion, an outlet ramp portion, and a throat portion intermediate the inlet and outlet ramp. In addition, a flow control blade means is provided in generally opposed relationship to the throat portion of the Venturi, with the blade means having an outer tip which, itself, extends generally along a chordal line across the boom and in generally parallel relationship to the chordal line defined by the Venturi throat. The blade means further extends radially inwardly of the boom and at an angle which converges toward the distal end of the boom. The opening which is defined between the inner tip of the flow control blade and the surface of the Venturi ramp is substantially rectangular. This rectangular configuration for the open area or zone provides a means for equalizing the flow of air across the entire opening within the boom, with this feature having been found to considerably reduce any tendency of the granular material, particularly impregnated granular material, to build up in the area of the Venturi and thus contribute to clogging. This reduction in tendency toward clogging has been found to be useful in connection with the rinse system of the present invention, and further contributes to a continuous recirculation of drying air along the individual booms and through the distribution head.

It has been found that the cleaning and rinse system of the present invention provides for even and positive flow of water into the head and through the entire system, including the flow of rinse water through the booms. Furthermore, this uniform flow of water is maintained without creating blind spots or creating tendencies toward avoidance of exposure to water in certain areas within the components forming the system.

Therefore, it is a primary object of the present invention to provide an improved system for uniform delivery of cleaning and rinsing water from a water source, wherein the water may be caused to flow through the entire system including passage through each of the elongated delivery booms.

It is yet a further object of the present invention to provide an improved system for uniform delivery of cleaning and rinsing water to a pneumatic spreader, and wherein the rinsing water is delivered to the system at a point where uniform distribution of the water through the system is maintained.

Other and further objects of the present invention will become apparent to those skilled in the art upon a study of the following specification, appended claims, and accompanying drawings.

BRIEF DESCRIPTION OF THE DRAWINGS

FIG. 1 is a perspective view of the side and rear portions of a typical vehicle chassis supporting a vehicular-mounted system incorporating a distribution head, a compressor, and a plurality of elongated hollow delivery booms, and wherein the distribution head is provided with the improved cleaning and water rinse means of the present invention;

FIG. 2 is a vertical sectional view, partially broken away, and partially in schematic form, illustrating the cleaning and rinsing apparatus of the present invention mounted within the upper portions of a distributor head; and FIG. 3 is a top view of that portion of the apparatus illustrated in FIG. 2 with the cover removed therefrom, and illustrating the arrangement of the water rinsing annulus.

DESCRIPTION OF THE PREFERRED EMBODIMENT

Figure 1:
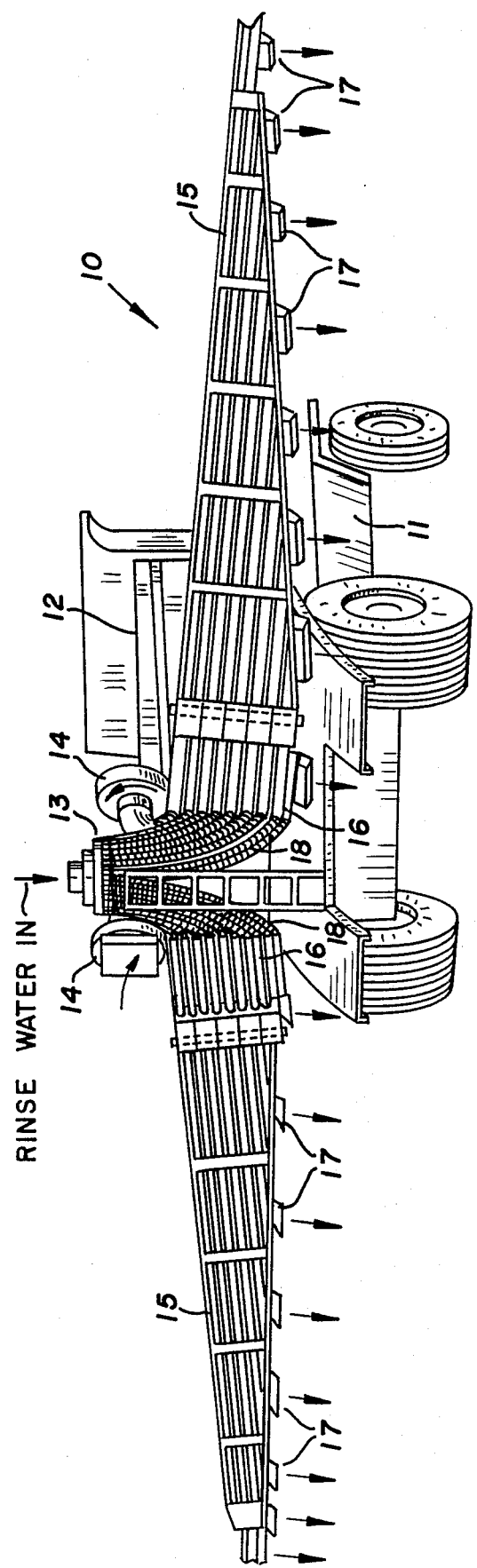

In accordance with the preferred modification of the present invention, and with particular attention being directed to FIG. 1 of the drawings, the pressurized pneumatic distribution system generally designated 10 is mounted upon vehicle chassis 11, and includes a reservoir 12 for retaining a source of supply of granular or particulate solids to be distributed through the system. A distribution head 13 is provided for apportioning or dividing the particulate solids received or delivered from reservoir or hopper 12 into a plurality of generally aliquot portions, with this distribution head having a controllable vent to atmosphere in the upper plate thereof for controlling the amount of air introduced into the system.

A plurality of elongated hollow delivery booms 15—15 are provided to receive, transfer or move laterally outwardly, and ultimately spread the solids on the ground, with the booms being of predetermined and differing lengths, and extending laterally outwardly of the vehicle from proximal ends 16—16 to distal discharge ends 17—17. A source of compressed air such as fan blower 14 for the pressurized pneumatic system is utilized to create a flow of pressurized air into a plenum or manifold 14A and from the plenum into the proximal ends 16—16 of each boom, and ultimately through each of the hollow elongated booms 15 to outlet or discharge. Such blowers or other sources of compressed air, and their arrangement in this type of system are, of course, well known to those in the art, and need not be described in detail here. As is apparent in FIG. 1, a cooler device may be employed in combination with one of the blowers in order to cool hydraulic fluid being used to drive components within the system. Such a device is illustrated in FIG. 1. A plurality of tubular feed members 18—18 are also provided, with each of such tubular feed members extending between and coupling a selected output of the distribution head 13 to a selected one of said delivery booms 15—15 Also, as is conventional, the tubular feed members 18—18 provide for delivery of each of the aliquot portions into the elongated boom 15 at a point adjacent the proximal end 16, and for ultimate delivery to the distal discharge end 17 of the boom. This portion of the system including the distribution head 13 and tubular feed members 18—18 also provide a means for delivery and transmission of rinse water from the point of its entry into the system through that portion of the system leading to the booms. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

As will become apparent hereinafter, each of the tubular feed members 18—18 is coupled to a selected one of the hollow delivery booms 15—15 at a juncture point adjacent the proximal end of one of the booms, and thus achieves its purpose of continuously and uniformly introducing one aliquot portion of the particulate solids to the flow of pressurized air moving through each of the delivery booms as well as for the rinsing water. During normal operation, and while the boom is delivering particulate solids through its delivery port, introduction of those particulate solids into the delivery booms is undertaken on a basis such that the actual introduction of the solids into the flow of pressurized air is enhanced, thereby reducing if not totally eliminating tendencies of the solid particles to build up in selected locations, and thereby leading to clogging of the boom.

Figure 2:
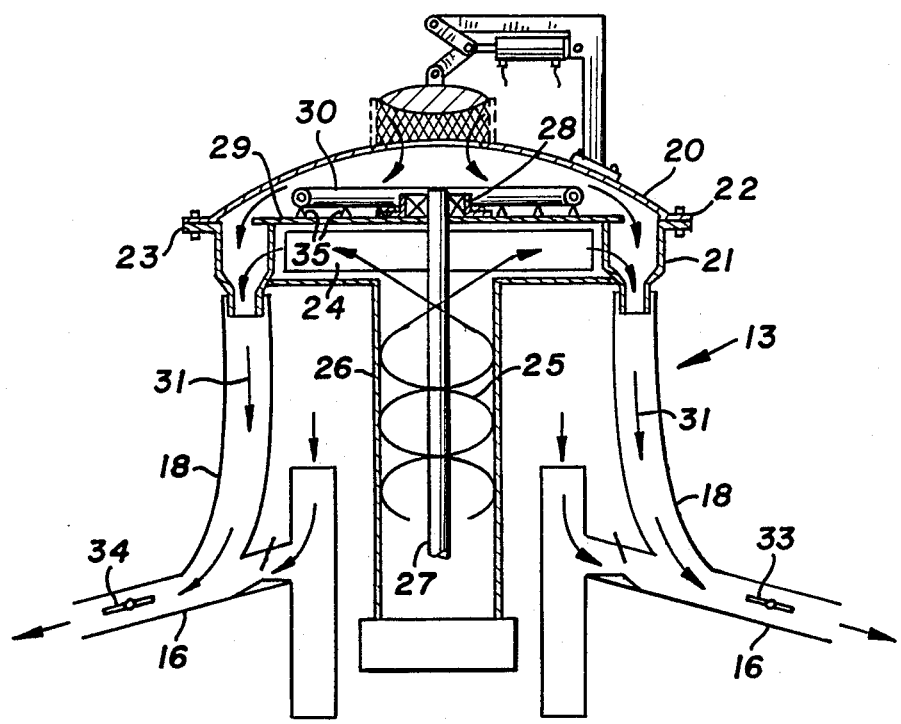
Figure 3:
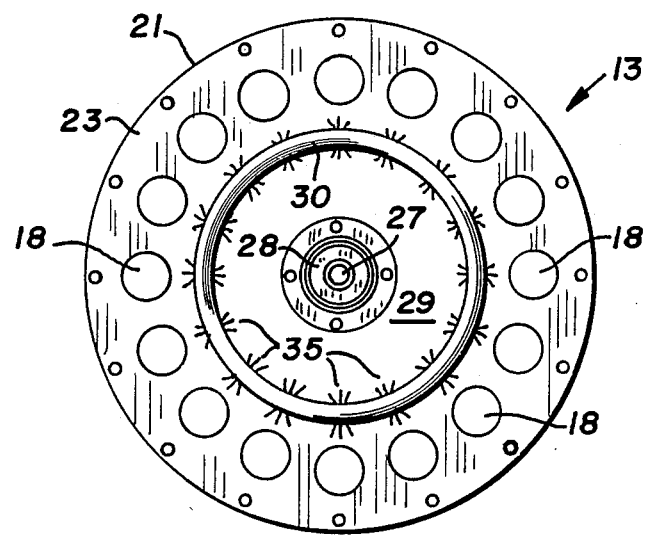

Attention is now directed to FIGS. 2 and 3 of the drawings wherein the interior of the distribution head is illustrated. Specifically, and in FIG. 2, distribution head 13 includes a cover member 20 overlying the flanged outer periphery of body member 21, with cover 20 joining member 21 at and along mating surfaces 22 and 23 respectively. An internally arranged spinner 24 is provided which rotates with auger screw 25 disposed within auger housing or sleeve 26. Shaft 27 extends upwardly from auger screw 25, and is maintained within a bearing housing such as at 28. In the arrangement illustrated, bearing housing 28 is shown mounted upon the top surface of plate member 29, although in certain applications, it may be desirable for bearing 28 to be disposed on the underside of plate 29. Spinner 24 is preferably provided with arcuately formed arms, which are mounted at their inner ends on shaft 27. Spinner 24 moves solid material, such as granular material as well as water discharged therein through annulus 30, outwardly along the path of arrows 31. As indicated, the granular material, such as fertilizer or the like, moves along a path from the lifting auger 25, outwardly through spinner elements 24, and thence into tubular feed members 18—18. As is indicated in FIG. 2, annulus 30 is provided with a plurality of spaced-apart orifices, each adapted to spray a flow of water into the system whenever the rinsing operation is underway.

With continued attention being directed to FIG. 2, it will be noted that dampers are arranged within lines 16, such as at 33 and 34. These dampers are utilized for flow-control purposes, and are arranged in a disposition wherein cleaning and rinsing of their surfaces occurs when rinse water is introduced through annulus 30.

It will be noted that annulus 30 has a plurality of individual orifices 35—35 arranged in spaced-apart relationship therearound. These orifices are utilized to provide the introduction of rinse water into the system at spaced-apart locations, so that blind spots do not occur in the system and further permitting the entire system to be adequately cleaned and rinsed on an as-required basis. For most purposes, approximately one orifice is provided for each outlet from the distribution head, with each such orifice being disposed immediately above the outlet from the distribution head.

It will be appreciated that the details of the design illustrated here are for purposes of illustration only, and are not to be construed as a limitation upon the scope of the present invention.

What is claimed is:

1. In combination; a system for pneumatically spreading granular particles upon the ground wherein the system is mounted upon a self-propelled vehicle and including a distribution head means for metering and apportioning particulate solids from a source into a plurality of generally aliquot portions, a plurality of elongated hollow delivery booms of predetermined and differing lengths extending laterally outwardly of said vehicle from a proximal end to a distal discharge end, a source of compressed air for creating a flow of pressurized air through said hollow elongated booms, a plurality of tubular feed members, each extending between said distribution head and a selected one of said delivery booms, for creating a fluid communication link between each of said booms and said distribution head to accommodate delivery of each of said aliquot portions from the proximal end to the distal discharge end of a boom when operative and as water cleaning and rinsing means therefor, the combination being characterized in that:

(a) said water cleaning and rinsing means comprising an annulus disposed within said distribution head means, and arranged to discharge a spray of water into said distribution head means for passage through said distribution head and into said tubular feed members for ultimate passage outwardly of said booms.

2. The combination as defined in claim 1 being particularly characterized in that said annulus has a plurality of water discharging orifices arranged in spaced-apart relationship thereon and wherein said cleaning and rinsing water is adapted to pass from said orifices into said tubular feed members and outwardly of said delivery booms.

* * * * *